(12) United States Patent
Rudy et al.

(10) Patent No.: US 7,845,092 B2
(45) Date of Patent: Dec. 7, 2010

(54) LINEAR GUIDE UNIT WITH LENGTH MEASURING SYSTEM

(75) Inventors: Dietmar Rudy, Kleinbundenbach (DE);
Martin Menges, Homburg (DE);
Michael Rebmann, Niederguilbach (DE)

(73) Assignee: Schaeffler Technologies GmbH & Co., Herzogenaurach (DE)

( * ) Notice: Subject to any disclaimer, the term of this patent is extended or adjusted under 35 U.S.C. 154(b) by 235 days.

(21) Appl. No.: 11/913,591

(22) PCT Filed: Apr. 25, 2006

(86) PCT No.: PCT/EP2006/003773
§ 371 (c)(1),
(2), (4) Date: Nov. 30, 2007

(87) PCT Pub. No.: WO2006/117096
PCT Pub. Date: Nov. 9, 2006

(65) Prior Publication Data
US 2008/0189972 A1    Aug. 14, 2008

(30) Foreign Application Priority Data
May 4, 2005    (DE) .................. 10 2005 021 345

(51) Int. Cl.
*G01B 7/02* (2006.01)
(52) U.S. Cl. .................................... 33/706; 33/708
(58) Field of Classification Search ............ 33/706, 33/707, 708, 700, 703, 1 M, 501.6, 503
See application file for complete search history.

(56) References Cited

U.S. PATENT DOCUMENTS

| | | | | |
|---|---|---|---|---|
| 3,535,793 A | * | 10/1970 | Williams et al. | 33/700 |
| 4,567,663 A | * | 2/1986 | Gillespie | 33/501.6 |
| 5,687,489 A | * | 11/1997 | Tondorf et al. | 33/706 |
| 6,145,214 A | * | 11/2000 | Shimano et al. | 33/706 |
| 6,769,195 B2 | * | 8/2004 | Huber et al. | 33/706 |
| 6,826,847 B2 | * | 12/2004 | Wahl et al. | 33/706 |
| 2005/0076526 A1 | * | 4/2005 | Greubel | 33/706 |
| 2010/0040312 A1 | * | 2/2010 | Rudy et al. | 384/7 |
| 2010/0175272 A1 | * | 7/2010 | Rudy et al. | 33/708 |

FOREIGN PATENT DOCUMENTS

| | | |
|---|---|---|
| DE | 4438079 | 5/1996 |
| DE | 19955038 | 9/2000 |
| DE | 19941587 | 3/2001 |
| DE | 10214426 | 10/2003 |
| DE | 10214427 | 10/2003 |
| EP | 1571421 | 9/2005 |
| JP | 56081406 A * | 7/1981 |
| JP | 11295013 A * | 10/1999 |

* cited by examiner

*Primary Examiner*—R. A. Smith
(74) *Attorney, Agent, or Firm*—Volpe and Koenig, PC

(57) ABSTRACT

A linear guide unit is provided having a guide carriage (2) that can be moved in a longitudinal direction on a guide rail (1) and a length measuring system with a measuring head (3) that cooperates with a measuring body (4) arranged parallel to the guide rail (1). The measuring body (4) is located at a distance from the guide rail (1) and arranged within a clearance profile of the linear guide unit.

15 Claims, 5 Drawing Sheets

LINEAR GUIDE UNIT WITH LENGTH MEASURING SYSTEM

BACKGROUND

The present invention relates to a linear guide unit provided with a length measuring system. Such linear guide units are used, for example, in machine tool construction or in transport devices of assembly lines or in woodworking. The length measuring systems allow highly precise positioning of the guide carriage at predetermined positions.

From DE 199 41 587 A1, for example, a linear bearing with a measuring device is known, wherein a guide carriage is arranged so that it can move in the longitudinal direction on a guide rail. The guide carriage is provided on the end with a measuring head. The guide rail is provided on its upper side with a groove, in which a measuring body is inserted. The measuring body is here constructed in one piece with a cover strip, which is held with a non-positive fit in the groove of the guide rail. Alternatively, the measuring body can be adhered to the flat strip. If the measuring body should need to be changed, this is possible by exchanging just the measuring body with the cover strip.

For other known linear bearings with integrated measuring systems, in the condition at the time of delivery, the scale or the measuring body is adhered to the guide rail. In this case, exchanging a measuring body without exchanging the guide rail is possible only with difficulty.

SUMMARY

The objective of the present invention is to provide a linear guide unit according to the features of the preamble of Claim 1, in which the measuring body can be exchanged without a problem. According to the invention, this objective is met in that the measuring body arranged at a distance from the guide rail is arranged within the clearance profile of the linear guide unit.

The rectangular cross section defined by the width and the height of the linear guide unit is designated as the clearance profile, wherein the width is defined by the width of the guide carriage and wherein the height is defined by the distance between the base surface of the guide rail and the mounting surface or head surface of the guide carriage mounted on the guide rail. The linear guide unit consequently defines a rectangular cross section, which has the mentioned height and width.

The invention offers several advantages. First, it is guaranteed that the measuring body can be exchanged independent of the guide rail. For exchanging the measuring body, neither the guide rail has to be detached nor does a cover strip have to be removed. The second advantage can be seen in that the measuring body is arranged within the clearance profile. The width and the height of the clearance profile for linear guide units are described in DIN 645-1 and 645-2 in the form of a table, in which standardized sizes of the guide carriage are specified. The manufacturers of linear guide units are held to these DIN standards. For users of such linear guide units, the advantage of standardization can be seen in that for the design of, for example, assembly lines, these standards can be referenced and the necessary requirements for installation space for the linear guidance of objects can be well provided for. The integration of the measuring body within the clearance profile proposed according to the invention does not restrict the applicability of these standards in any way.

It has been shown that length measuring systems that involve the inductive measurement principle are especially well suited for the present invention. For the inductive measurement principle, the measuring body can be formed, for example, by a round rod. This round rod can be provided in large lengths of over 30 m length. These round rods can be formed of a stainless-steel tube, which is filled with a plurality of chromium-nickel elements arranged one behind the other. In this case, the measuring head can be, for example, an aluminum cast part, which contains a coil assembly and electronics. The measuring head can surround the tubular measuring body like a ring. The measuring head can be provided with a plurality of receiver coil sets. Each set can be composed of four identical windings, which are arranged at intervals of a scale division. Based on this distance, each coil in a set is positioned above an identical part of an adjacent chromium-nickel element. All of the coils of a set are connected in series. The driving coil is located above the exploring coil. Through the chromium-nickel element in the scale, the magnetic permeability of the scale changes periodically over a scale division. The voltage induced in each group of exploring coils changes according to the relative positions of the coils to the chromium-nickel elements lying underneath. The coils have such a distance that when a group of coils is at a maximum, another group, which is spaced apart at a division of half the chromium-nickel element, is at a minimum. These coil pairs are combined by forming a difference, in order to generate signals, which change with the displacement. These combined signals are phase-shifted by the electronic circuits in the measuring head. The signals are added and filtered. The result is an output signal, whose phase changes when the measuring head is shifted along the measuring body.

Preferably, the measuring carriage is provided with a passage opening for receiving the measuring body. The guide carriage can be provided in the passage opening with a guide for the measuring body. This is preferred when the measuring body is very long. Typically, a measuring body is supported at its two ends. At one end there can be a movable support and at the other end there can be a fixed support. For a large spacing between the movable and fixed supports, a support of the measuring body on the guide carriage is useful, if necessary. Alternatively or additionally, the measuring body can also be stretched between these two supports. In this case, the two supports are constructed as fixed supports.

The passage opening can be constructed on a longitudinal side of the guide carriage as a groove open towards this longitudinal side. The groove can be milled with high precision, for example, using a milling cutter. In this case, the measuring body can lie at the edge of the clearance profile of the guide carriage, but nevertheless still within this clearance profile. The groove, however, can also be considered to already have an angular form on a plastic part of the guide carriage. The groove can also be constructed on the head side of the guide carriage, or on the screw-down surface of the guide carriage.

Alternatively, the passage opening can also be constructed as a borehole. The guide carriage can have an inner support part made from metal, on which tracks for roller bodies are formed, so that the roller bodies can roll on these tracks under loading. Frequently, guide carriages are provided, in which this support part is injection molded with plastic, wherein return channels for returning roller bodies can be provided in this plastic part. In this case, the borehole mentioned above can be taken into account for passing the measuring body into the injection mold. The measuring body constructed as a round profile can then be led through this borehole and optionally guided in this borehole.

The measuring head of the length measuring system can also be housed within the clearance profile of the guide carriage. For example, it is conceivable to mount the measuring head on one end of the guide carriage. Typically, the guide carriage engages around the guide rail with its two legs connected to each other by a back, wherein the back is provided with a screw-down surface for a machine part. In this case, the measuring head can also be mounted on one of the two legs. In this case, it may be preferable when a recess for holding the measuring head is provided on this leg or on the back. The measuring head can be integrated in this leg, so that the measuring head is also arranged within the clearance profile of the guide carriage.

The problem that another support point can be useful if there is a very large supporting distance for the measuring body was already discussed farther above. This can be useful for arrangements—at a distance from the guide rail—for the measuring body proposed according to the invention. For a problem-free support of the measuring body, it is proposed in another solution according to the invention that support parts arranged one behind the other in the longitudinal direction of the guide rail are provided for supporting the measuring body arranged at a distance from the guide rail, wherein the guide carriage is arranged between the bearings parts.

These support parts can both be arranged as fixed supports, wherein the measuring body can be stretched between these two support parts, that is, there is no sag. Alternatively, these two support parts can be constructed as a movable support and a fixed support for the measuring body. Then it may be useful for a very large distance between the movable and fixed supports to provide two additional support parts as traveling support parts, which are supported so that they can move longitudinally on the guide rail or on a parallel rail arranged parallel to the guide rail and which are connected to each other to form a traveling bridge, wherein the distance between the two traveling support parts is greater than a length of the guide carriage. The measuring body is supported without a problem on the two traveling support parts, so that undesired sag in the measuring body is prevented. These two traveling support parts can be provided with guides for a longitudinal guide of the measuring body. A low-friction displacement of the measuring body in these guides is consequently guaranteed.

Within limited back and forth movements of the guide carriage that are smaller than a distance between the two traveling support parts of the traveling bridge, the traveling bridge remains unchanged in its position. However, if the guide carriage is displaced over larger stretches, it takes the traveling bridge with it. For this purpose, it can be preferred when the guide carriage is provided with catches and the two traveling support parts are provided with stops for the catches, wherein the guide carriage in contact with the stop takes along the traveling bridge in both longitudinal directions. In this way, it is also guaranteed for very long measuring bodies that a problem-free alignment of the measuring body relative to the measuring head is guaranteed between these two traveling support parts. More than two support parts that move longitudinally can also be provided. For example, an inner traveling bridge and an outer traveling bridge can be provided, wherein the inner traveling bridge is arranged between the two traveling support parts of the outer traveling bridge. The two traveling bridges can be connected to each other by means of telescoping rods. When the guide carriage is shifted, it first takes along the traveling support part of the inner traveling bridge and after further travel along the guide rail, it takes along the outer traveling bridge. The traveling support parts of the two traveling bridges set on the other end of the guide carriage are pulled towards each other to a preset distance by telescoping connections and pulled apart from each other towards the guide carriage.

The traveling bridges can be formed so that the two traveling support parts are connected rigidly to each other by means of rods, wherein these rods can be passed through passage openings of the guide carriage. These passage openings can also be taken into account, for example, in the production of the guide carriage in an injection mold.

BRIEF DESCRIPTION OF THE DRAWINGS

Below, the invention will be explained in more detail with reference to six embodiments illustrated in the total of seven figures.

DETAILED DESCRIPTION OF THE PREFERRED EMBODIMENTS

Figure 1:
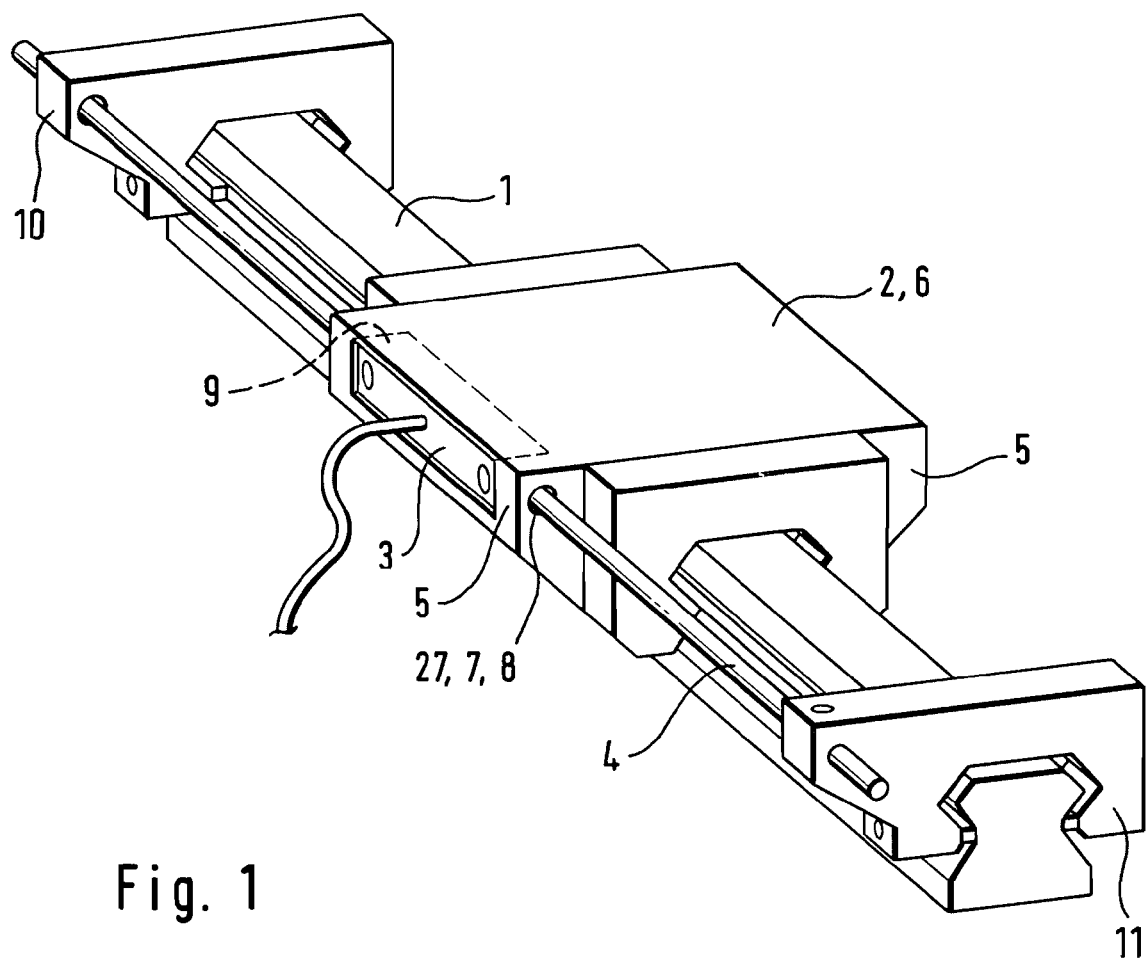
FIGS. 1 to 6 each show different linear guide units according to the invention in perspective views.

The linear guide unit according to the invention and illustrated in FIG. 1 has a guide carriage 2 guided on a guide rail 1 so that it can move longitudinally. In a known way, roller bodies not shown here in more detail roll on tracks of the guide rail and the guide carriage under loading. These tracks define a load channel. The roller bodies circulate in endless roller body channels, wherein each roller body channel has the already mentioned load channel, a return channel, and two turn-around channels connecting the return channel and the load channel in an endless way. The turn-around channels and the return channels are provided completely in the guide carriage 2.

The linear guide unit according to the invention further comprises a length measuring system that has a measuring head 3 and a measuring body 4. This length measuring system works on the induction principle. The measuring body 4 is constructed as a round rod. This measuring body 4 is formed from a stainless-steel tube, in which a plurality of chromium-nickel elements arranged at a predetermined spacing are located. The measuring head 3 is equipped so that for a relative displacement between the measuring body 4 and the measuring head 3, sinusoid signals are generated, which are used for an evaluation. These measuring bodies 4 constructed as round rods are especially suitable for the present invention, because such measuring bodies can be housed favorably within the clearance profile of the guide carriage 2 and thus also within the clearance profile of the linear guide unit.

The guide carriage 2 engages with its two legs 5 around the guide rail 1, wherein the two legs 5 are connected to each other by a back 6. On one leg 5 there is a passage opening 7, through which the measuring body 4 is guided. This passage opening 7 is presently constructed as a borehole 8. This leg 5 is also provided with a recess 9, which is shown here only with dashed lines and in which the measuring head 3 is inserted. In this way, it is guaranteed that the measuring head 3 is also arranged within the clearance profile of the guide carriage 2.

The measuring body 4 is supported on each of its two ends on a support part 10, 11, wherein the support part 10 is constructed as a movable support and the support part 11 is constructed as a fixed support for the measuring body 4. The guide rail 1 has a prism-like profile seen in cross section. The support parts 10, 11 are provided with a corresponding prism shape, so that the support parts 10, 11 are aligned without a problem on the guide rail 1. The problem-free alignment of the support parts 10, 11 ensures that the measuring body 4 is arranged without a problem parallel to the guide rail 1.

Figure 2:
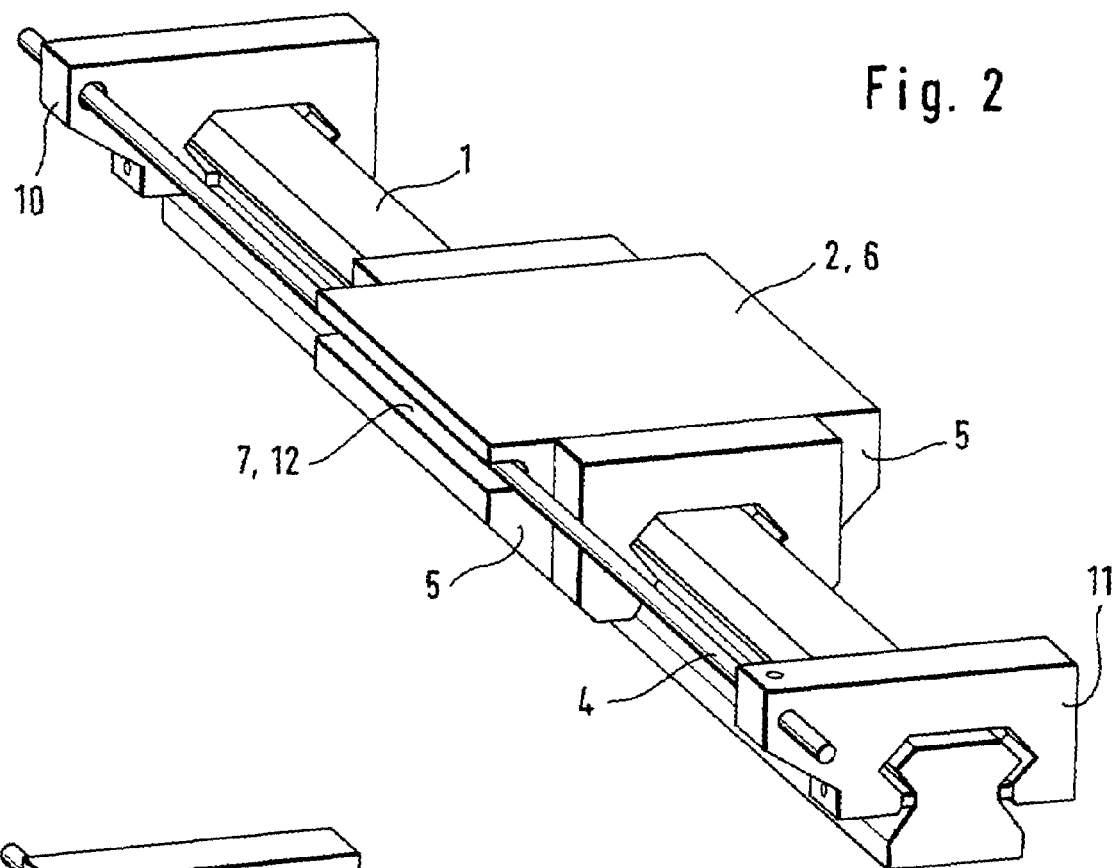

The linear guide unit according to the invention and illustrated in FIG. 2 differs from the linear guide unit according to FIG. 1 essentially in that the passage opening 7 is constructed as an open groove 12. Another difference is provided in that the measuring head 3 not shown here is set on the longitudinal side of the leg 5, so that the open groove 12 is covered. In this case, it is also guaranteed that the standardized structural masses of the guide carriage 2 are not exceeded, so that it is also guaranteed for this refinement according to the invention that both the measuring head and also the measuring body are arranged within the clearance profile of the standardized guide carriage 2.

Figure 3:
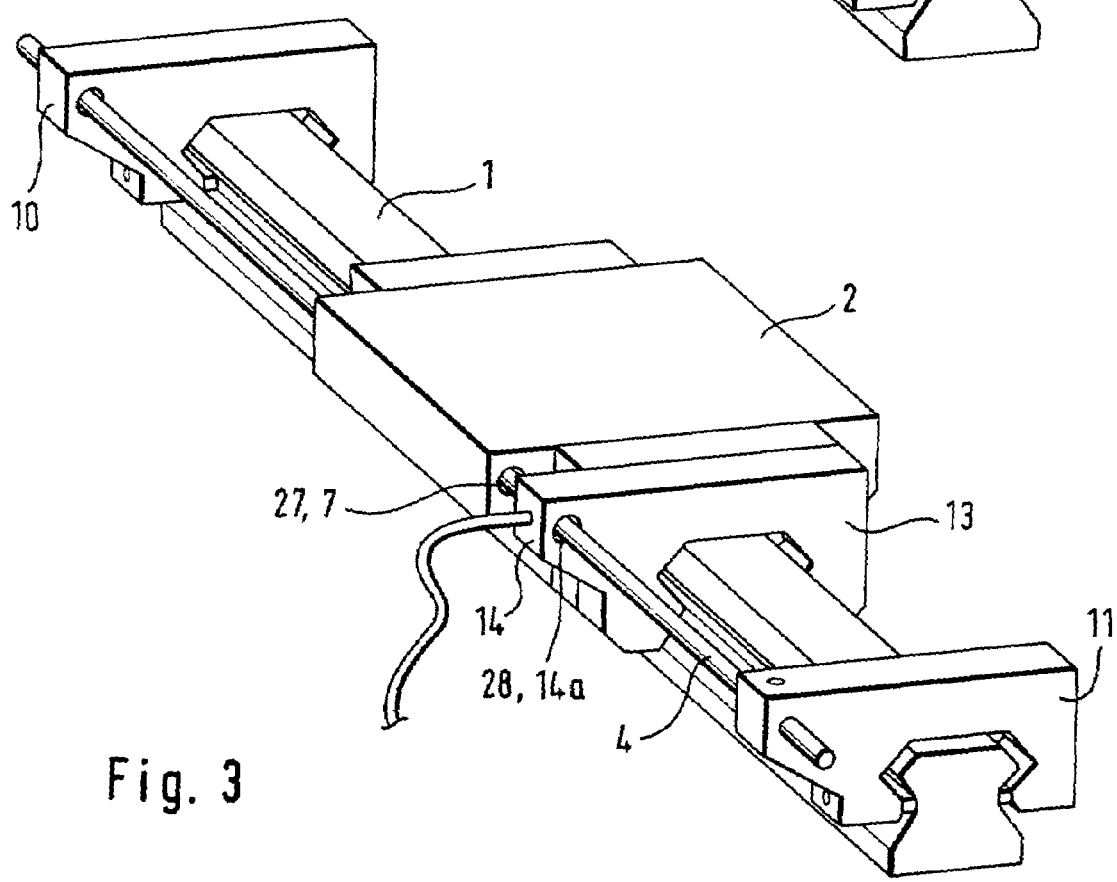

The linear guide unit according to the invention and illustrated in FIG. 3 differs from that from FIG. 1 essentially in that a measuring head 13 is arranged at one end of the guide carriage 2, wherein here it is also guaranteed that the measuring head 13 is arranged within the clearance profile of the guide carriage 2. The measuring head 13 has a passage opening 14a, which is constructed as a measuring point opening 14 and through which the measuring body 4 is guided. Just like in the embodiment according to FIG. 1, here the guide carriage 2 is also provided with a passage opening 7, through which the measuring body 4 is guided.

If the distance between the two support parts 10, 11 is very large, for preventing undesired sagging of the measuring body 4, the measuring body can be stretched; in this case, both support parts 10, 11 are constructed as fixed supports. An alternative possibility for the trouble-free alignment of the measuring body is also shown for large distances between these support parts 10, 11 for the linear guide units according to the invention from FIGS. 4 to 6.

Figure 4:
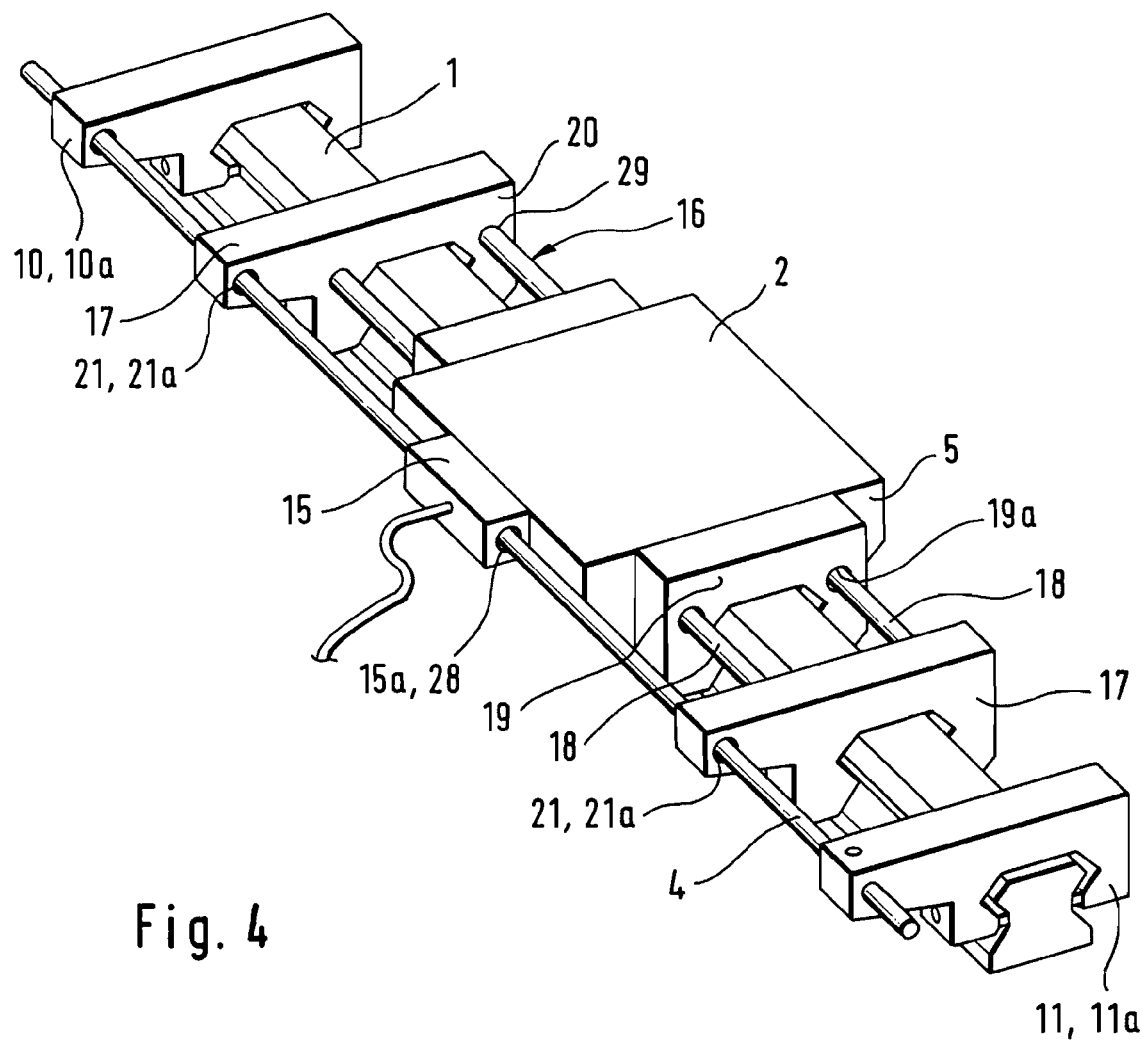

For the linear guide unit according to FIG. 4, the guide carriage 2 is similarly arranged on the guide rail 1 so that it can move longitudinally in the described way. Just like in the embodiments described above, the guide carriage 2 runs between the two support parts 10, 11 for the problem-free alignment of the measuring body 4 relative to the guide rail 1. On one longitudinal side, the guide carriage 2 is provided with a measuring head 15, through which the measuring body 4 is guided, wherein the measuring head 15 is provided with a passage opening 15a constructed as a measuring point opening, through which the measuring body 4 is guided.

The two support parts 10, 11 are presently provided as end support parts 10a, 11a. A traveling bridge 16 is provided between these two end support parts 10a, 11a fixed relative to the guide rail 1. This traveling bridge 16 is arranged so that it can move relative to the guide rail 1. The traveling bridge 16 comprises two traveling support parts 17, which are held on the guide rail 1 by sliding or rolling supports. The two traveling support parts 17 are connected to each other rigidly by means of two rods 18. The rods 18 are arranged parallel to the guide rail 1 and are guided through passage openings 19 in the guide carriage 2. The guide carriage 2 can move back and forth between these two traveling support parts 17. The guide carriage 2 is provided on its two ends each with a catch 19, which is presently formed by the end face of the guide carriage 2. The traveling bridge 16 is provided with stops 20 for the catch 19. The two traveling support parts 17 are further provided with guides 21 for the measuring body 4, so that the measuring body 4 is aligned without a problem relative to the guide rail 1 and the measuring head 15. For larger travel paths of the guide carriage 2, the catches 19 impact the stops 20, so that for further travel of the guide carriage 2, the traveling bridge 16 is taken along by the guide carriage 2. Also for very large distances between the two end support parts 10a, 11a it is thus guaranteed that a problem-free alignment of the measuring body 4 to the guide rail is guaranteed in any position of the guide carriage 2.

Figure 5:
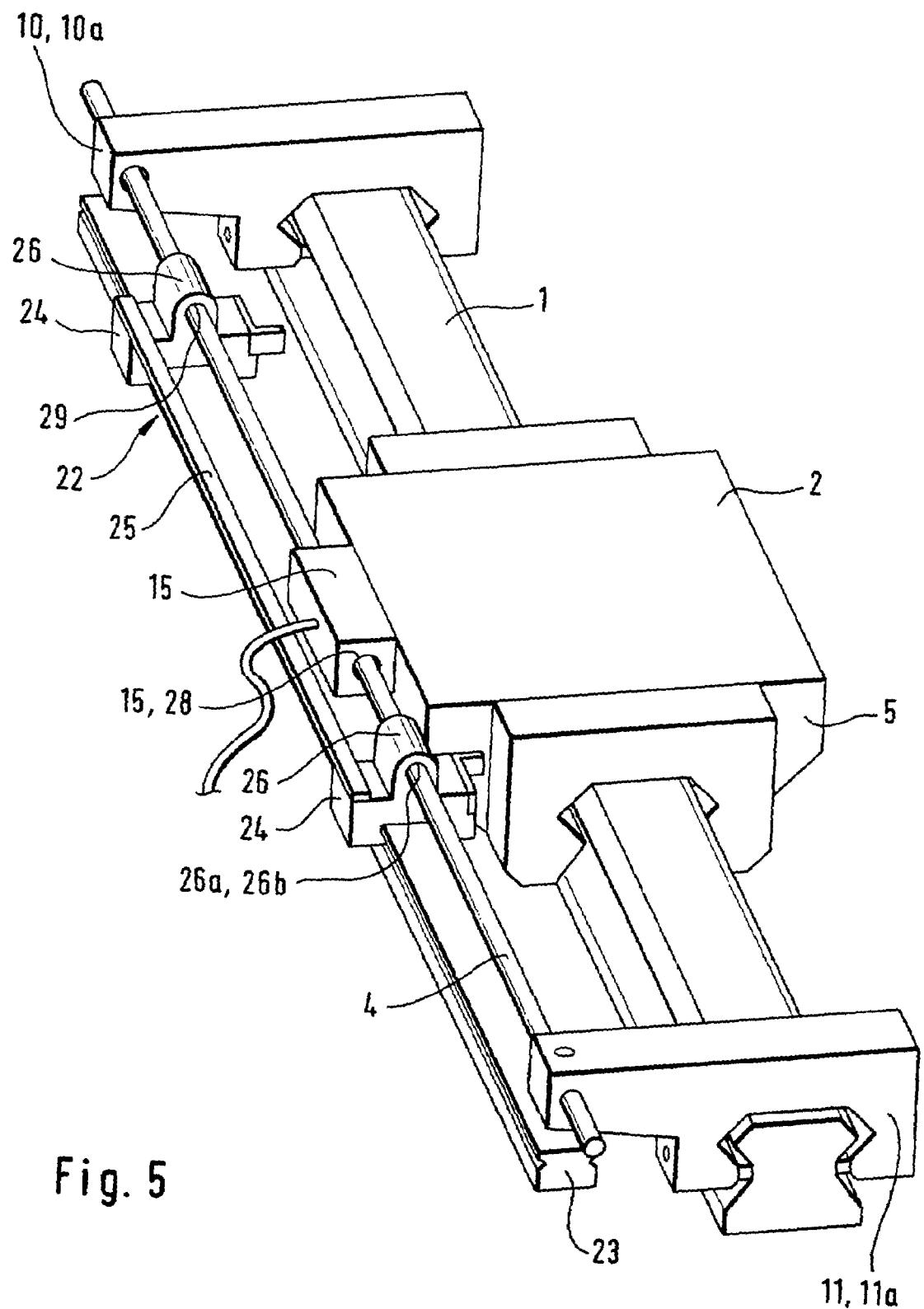

The linear guide unit according to the invention from FIG. 5 differs from that from FIG. 4 essentially by a modified traveling bridge 22. This traveling bridge 22 has a parallel rail 23, which is arranged without a problem parallel to the guide rail 1. Two traveling support parts 24, which are arranged at a distance to each other and are connected rigidly to each other by a rod 25, are arranged on this parallel rail 23. The working principle of this traveling bridge 22 corresponds to that of the traveling bridge 16 of the linear guide unit according to the invention from FIG. 4. The traveling support parts 24 are roller supported on the parallel rail 23, wherein here roller bodies also circulate in endless roller body channels. Obviously, instead of endless roller bearings, sliding bearings are possible just as well. The parallel rail 23 and the traveling support parts 24 have tracks for the roller body, so that the traveling bridge 22 is arranged so that it can easily move relative to the parallel rail 23. Problem-free positioning of the measuring body 4 relative to the guide rail 1 is also guaranteed in this refinement according to the invention.

Figure 6:
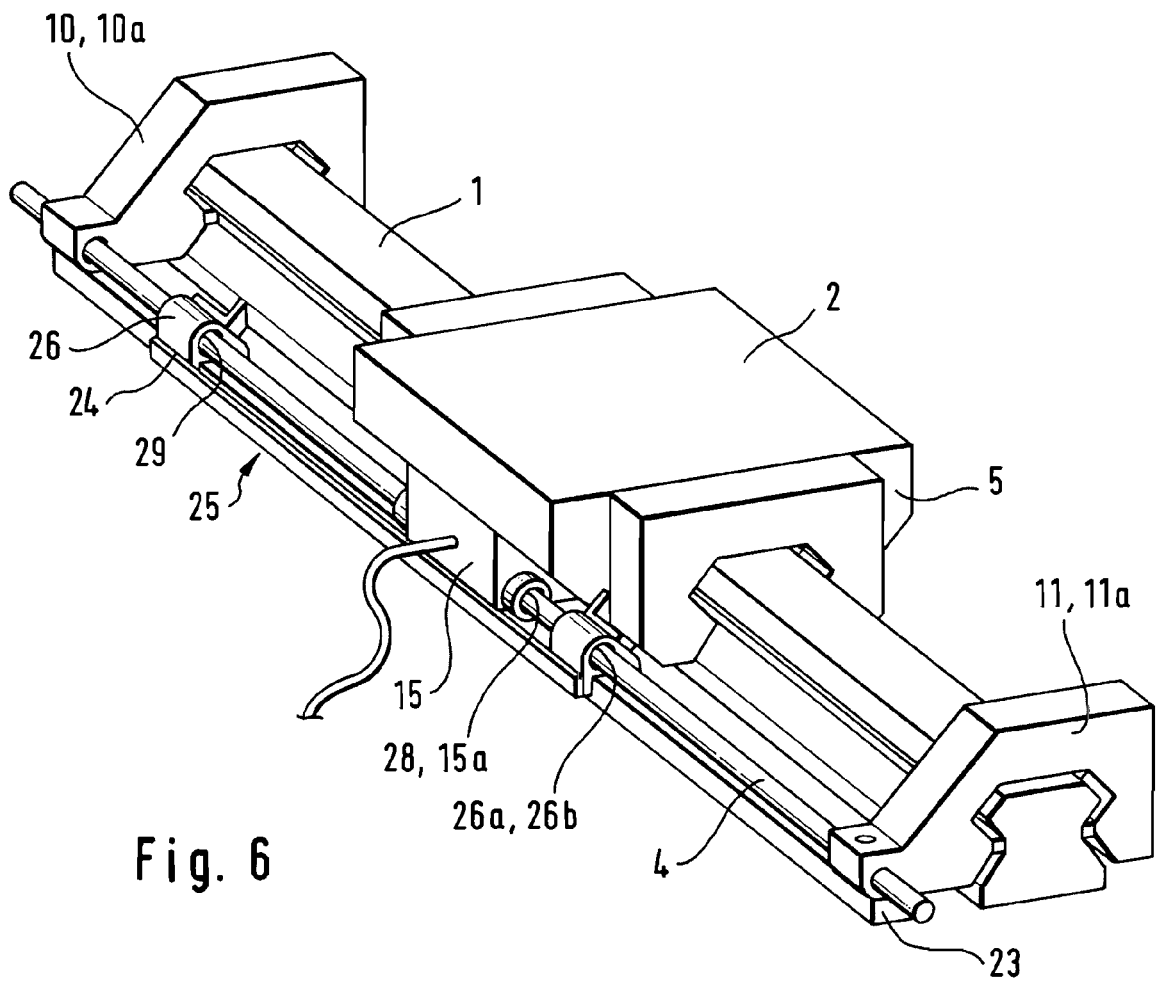

While the linear guide unit from FIG. 5 provided with the traveling bridge according to the invention prefers an arrangement of the length measuring system outside of the clearance profile of the linear guide unit, for the linear guide unit according to the invention from FIG. 6, the measuring head 15 and the measuring body 4 are arranged within the clearance profile of the guide carriage 2. FIG. 6 clearly shows the arrangement of the measuring head 15 on an incline of the leg 5.

In all of the embodiments described here, a problem-free and simple replacement of the measuring body 4 is guaranteed. The measuring body 4 can be fixed to the fixed bearings 10 or 11 by simple clamping screws, so that only a detachment of the clamping screws is necessary for replacing the measuring body 4. The traveling support parts 24 are presently equipped with known tapered sleeves 26 as a guide 26a, so that easy guidance between the measuring body 4 and the traveling bridge 22 is guaranteed.

The guides 21, 26a have passage openings 21a, 26b for guiding the measuring body 4. The passage openings 7, 14a, 15a, 19a, 21a, 26b of the guide carriage 2 and the traveling support part 17, 24 are closed by a seal 27, 28, 29, which contacts the measuring body 4 in a sealing way.

Figure 7:
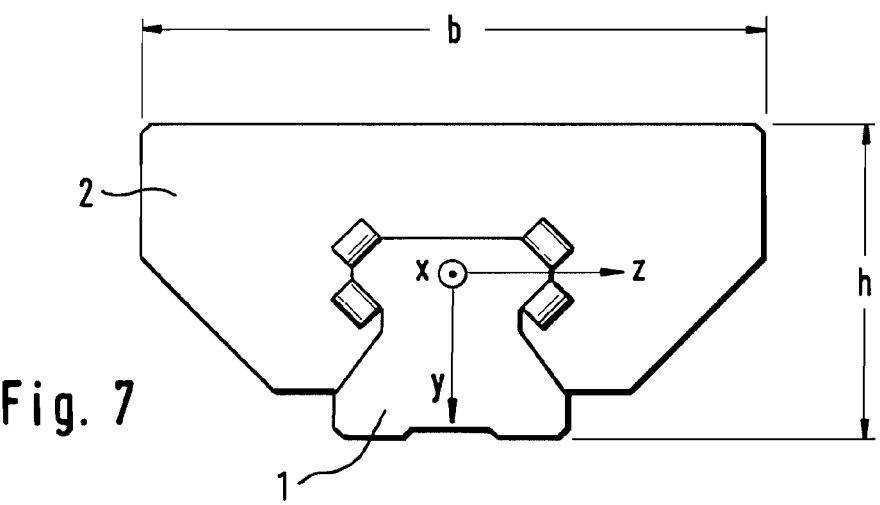
FIG. 7 shows a view of a linear guide unit according to the invention.

FIG. 7 shows the rectangular cross section, which is defined by the linear guide unit according to the invention and which is defined by the width b of the guide carriage 2 and the height h, wherein the height h gives the distance between the base surface of the guide rail 2 and the head surface or screw-down surface of the guide carriage 1 mounted on the guide rail 2. This rectangular cross section is designated as the clearance profile. The length measuring system in the embodiments according to FIGS. 1 to 4 is arranged within this clearance profile.

LIST OF REFERENCE SYMBOLS

1 Guide rail
2 Guide carriage
3 Measuring head
4 Measuring body
5 Leg
6 Back
7 Passage opening
8 Borehole
9 Recess 10 Support part
10a End support part
11 Support part
11a End support part
12 Groove
13 Measuring head
14 Measuring point opening
14a Passage opening
15 Measuring head
15a Passage opening
16 Traveling bridge
17 Traveling support part
18 Rod
19 Catch
19a Passage opening
20 Stop
21 Guide
21a Passage opening
22 Traveling bridge
23 Parallel rail
24 Traveling support part
25 Rod
26 Tapered sleeve
26a Guide
26b Passage opening
27 Seal
28 Seal
29 Seal

The invention claimed is:

1. Linear guide unit, comprising a guide carriage arranged to move longitudinally on a guide rail and with a length measuring system, having an electronic measuring head directly mounted on the guide carriage that cooperates with a partially exposed measuring body arranged parallel to the guide rail, the measuring body is spaced apart from the guide rail, supported at a first end and an opposing second end, and arranged along with the measuring head within a clearance profile of the guide carriage, the clearance profile defined by a cross section with a width defined by a width of the guide carriage and a height defined by a distance between a base surface of the guide rail and a head surface of the guide carriage.

2. Linear guide unit according to claim 1, wherein the guide carriage is provided with a separate passage opening for passing the measuring body.

3. Linear guide unit according to claim 2, wherein the separate passage opening is constructed as a groove that is open along its entire length toward a longitudinal side or head side of the guide carriage.

4. Linear guide unit according to claim 2, wherein the separate passage opening is constructed as a borehole.

5. Linear guide unit according to claim 1, wherein the measuring body has a round profile.

6. Linear guide unit according to claim 1, wherein the measuring head is housed within the clearance profile of the guide carriage.

7. Linear guide unit according to claim 1, wherein the guide carriage engages around the guide rail with two legs thereof that are connected to each other by a back, and the measuring head is mounted on one of the two legs.

8. Linear guide unit according to claim 7, wherein the guide carriage has a recess for holding the measuring head.

9. Linear guide unit, comprising a guide carriage arranged to move longitudinally on a guide rail and with a length measuring system, having a measuring head that cooperates with a measuring body arranged parallel to the guide rail, the measuring body is arranged at a distance from the guide rail and is arranged within a clearance profile of the guide carriage, wherein the length measuring system works inductively, wherein the measuring body is constructed as a tube with nickel-chromium elements arranged one behind the other in the tube.

10. Linear guide unit, comprising a guide carriage arranged to move longitudinally on a guide rail and with a length measuring system, having a measuring head that cooperates with a measuring body arranged parallel to the guide rail, and two support parts are arranged one behind the other in a longitudinal direction of the guide rail for supporting the measuring body which is arranged at a distance from the guide rail, and the guide carriage is arranged between the support parts, wherein the two support parts are fixed as end support parts and one of the end support parts is constructed as a movable support and the other end support part is constructed as a fixed support for the measuring body.

11. Linear guide unit according to claim 10, wherein the two support parts are configured as traveling support parts so that they can move longitudinally on the guide rail or on a parallel rail arranged parallel to the guide rail and are connected to each other to form a traveling bridge, and the distance between the two traveling support parts is greater than a length of the guide carriage.

12. Linear guide unit according to claim 11, wherein the traveling support parts are connected to each other rigidly by rods, which are passed through passage openings of the guide carriage.

13. Linear guide unit according to claim 11, wherein the guide carriage is provided with catches and the two traveling support parts are provided with stops for the catches, and the guide carriage in contact with the stop takes along the traveling bridge in both longitudinal direction.

14. Linear guide unit according to claim 11, wherein both traveling support parts are provided with guides for longitudinal guidance of the measuring body.

15. Linear guide unit according to claim 11,
wherein at least one of the guide carriage or the traveling support parts are provided with seals, which contact the measuring body in a sealing manner and which close passage openings of the guide carriage or of the traveling support parts.

* * * * *